United States Patent Office 3,092,545
Patented June 4, 1963

3,092,545
METHOD OF CONTROLLING MICROORGANISMS WITH 4,6-DIAMINO-2-ETHYLTHIO-5-NITROSO-PYRIMIDINE
Thomas B. Williamson, Santa Clara, Calif., assignor to Stauffer Chemical Company, New York, N.Y., a corporation of Delaware
No Drawing. Filed Dec. 8, 1961, Ser. No. 158,115
1 Claim. (Cl. 167—33)

This invention relates to new and novel pesticides. More particularly, the present invention relates to the use of the compound disclosed herein to control microorganisms selected from the class consisting of bacteria and fungi.

The compound as disclosed herein is 4,6-diamino-2-ethylthio-5-nitrosopyrimidine.

As is readily obvious, the object of the present invention is to effectively control bacteria and fungi by contacting the same with the compound of the present invention.

The pesticidal composition of the present invention may be made by the following series of reactions.

I. Reacting malononitrile and thiourea to form a heterocyclic compound.

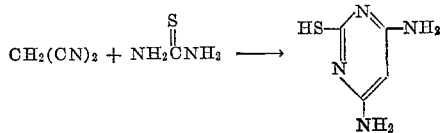

II. This heterocyclic compound is then reacted with an ethyl bromide to form 4,6-diamino-2-ethylthiopyrimidine.

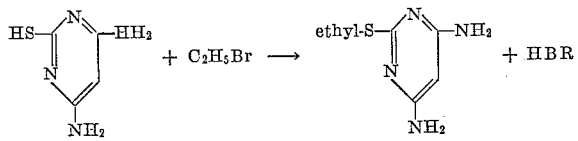

III. The thus formed 4,6-diamino-2-ethylthiopyrimidine is then reacted with nitrous acid to form the final product—4,6-diamino-2-ethylthio-5-nitrosopyrimidine.

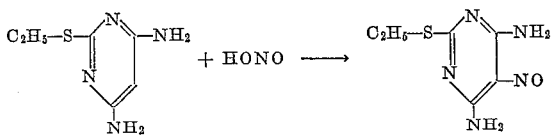

This is but one method of forming the compound of the present invention. Other preparatory methods will be obvious to those skilled in the art.

A typical microbiological screening or testing procedure is as follows:

A. *In vitro test.*—This test measures the fungicidal and bactericidal properties of a chemical compound when in contact with a growing fungus or bacterium in an artificial medium.

The compound, 4,6-diamino-2-ethylthio-5-nitrosopyrimidine, is placed in four vials of malt broth at the rate of 50 p.p.m. Next, water suspensions of spores or cells of *Aspergillus niger, Penicillium sp., Stemphylium sp.,* and *Escherichia coli* are added (one organism per vial). One week later results are read. If no growth is observed, other in vitro evaluation tests will be run using lower concentrations of the test compound to determine the minimum concentration which will control the organisms.

B. *Agar plate bactericide test.*—This test indicates whether or not a compound is active against bacteria on agar.

Varying amounts of the compound being tested are mixed with potato dextrose agar, allowed to harden and placed in Petri dishes. Spores or cells of *Staphylococcus aureus, Erwinia amylovora,* and *Escherichia coli* are dusted onto the agar and the dish is closed. One week later, growth of the bacteria is recorded as percent control.

C. *Soil fungicide incorporation test.*—This test indicates whether or not a compound is active against soil-borne pathogenic fungi.

The compound to be tested is pipetted into *Rhizoctonia solani* infested soil at varying rates, mixed thoroughly, and then dumped into paper containers. Cotton seeds are then planted into this infested and treated soil. Three to four weeks later plants are inspected for disease symptoms. The lowest concentration tested on the cotton plants which show no or only mild symptoms of disease are then reported.

The results of the aforementioned test with respect to 4,6-diamino-2-ethylthio-5-nitrosopyrimidine are as follows.

| In vitro test: | Minimum inhibitory concentration (p.p.m.) |
|---|---|
| Aspergillus niger | (10) |
| Penicillium sp | (5) |
| Stemphylium sp | *50 |
| Escherichia coli | (25) |
| Agar plate bactericide test: | |
| Staphylococcus aureus | *5 |
| Erwinia amylovora | *5 |
| Escherichia coli | 10 |
| Soil fungicide incorporation test: Rhizoctonia solani | (110) |

\* = lowest concentration (p.p.m.) tested.
( ) = partial inhibition at indicated p.p.m.

I claim:
A method of effectively controlling microorganisms selected from the class consisting of bacteria and fungi comprising contacting said microorganisms with an effective amount of 4,6-diamino-2-ethylthio-5-nitrosopyrimidine.

References Cited in the file of this patent
Chemical Abstracts, vol. 52, 18688f (1958); vol. 43, 3010b (1949).